United States Patent [19]
Madigan et al.

[11] Patent Number: 5,939,857
[45] Date of Patent: Aug. 17, 1999

[54] IN-TRACK CHARGING STATION AND METHOD

[75] Inventors: William Madigan, Warrenton; Floyd Swigget, Falmouth, both of Va.

[73] Assignee: Barrier Free Lifts, Inc., Manassas, Va.

[21] Appl. No.: 08/990,449

[22] Filed: Dec. 15, 1997

[51] Int. Cl.[6] .............................. H02J 7/00; A61G 7/10
[52] U.S. Cl. ................................ 320/107; 320/DIG. 34; 5/81.1 R
[58] Field of Search ..................................... 320/107, 109, 320/DIG. 34; 5/81.1 R, 83.1, 85.1, 87.1, 88.1, 86.1, 84.1, 89.1, 81.1 HS; 212/312, 320, 323

[56] References Cited

U.S. PATENT DOCUMENTS

| | | | |
|---|---|---|---|
| 4,944,056 | 7/1990 | Schroeder et al. | 5/85.1 |
| 5,138,953 | 8/1992 | Horcher et al. | 105/149.2 |
| 5,158,188 | 10/1992 | Nordberg | 212/312 |
| 5,511,256 | 4/1996 | Capaldi | 5/83.1 |
| 5,809,591 | 9/1998 | Capaldi et al. | 5/83.1 |

OTHER PUBLICATIONS

Photographs (2) of prior art device disclosed in present application—Barrier Free Lifts, Inc.

*Primary Examiner*—Peter S. Wong
*Assistant Examiner*—Gregory J. Toatley, Jr.
*Attorney, Agent, or Firm*—Blank Rome Comisky & McCauley LLP

[57] ABSTRACT

An in-track charging system for charging the batteries of ceiling-mounted patient lifts includes a spring-biased pin assembly integrated with a movable truck and one or more rail-mounted charging stations. The truck-mounted assembly includes multiple spring-biased brass pins having upper ends extending upward from a top surface of the truck and lower ends terminating inside the main body of the truck. A wiring cable electrically connects the lower ends of the pins with a battery to be charged. Insulated bushings surround the spring-biased pins to prevent electrical short circuiting to the body of the truck. Each rail-mounted charging station includes a pair of insulated conductive plates that are joined to the inner surface of the upper horizontal cross-piece of the rail using conductive screws and nuts. To prevent electrical short circuiting to the rail insulator bushings are placed around the screws. Wires are connected to the ends of the screws and terminate at a battery charging unit. To charge the battery, the truck is moved along the rail until it is directly beneath one of the charging stations. The position of the truck is adjusted such that the upper ends of the conductive pins rest against the heads of the screws securing the conductive plates to the rail. In that position, current passes from the charging unit, through the conductive pins and plates and to the battery.

19 Claims, 2 Drawing Sheets

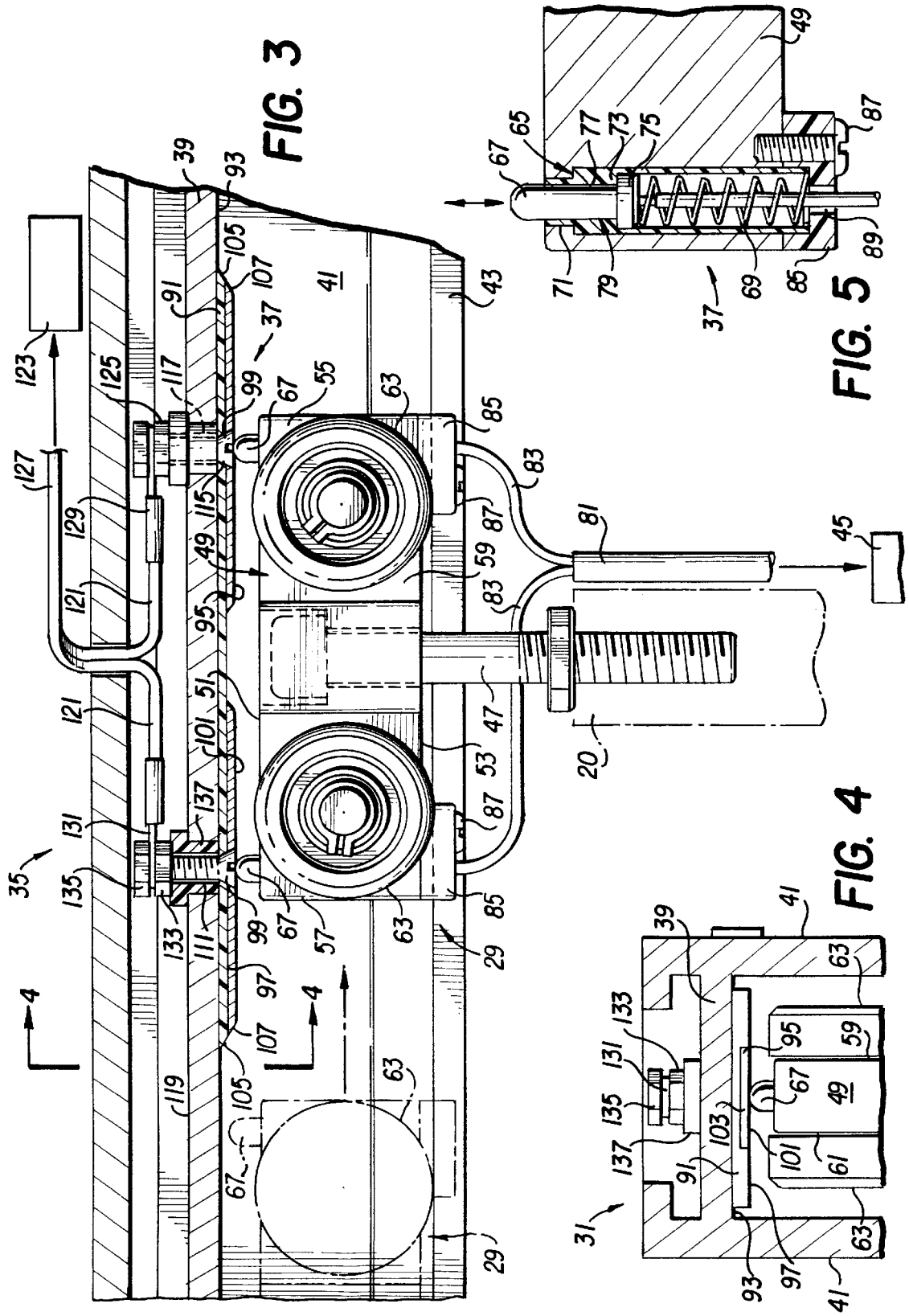

IN-TRACK CHARGING STATION AND METHOD

FIELD OF THE INVENTION

The present invention relates to in-track charging stations for charging the batteries of track-mounted lifting assemblies and more particularly to a system for charging batteries of ceiling-mounted lifts that is compatible for use with continuous or jointed rail systems.

BACKGROUND OF THE INVENTION

Hospitals and residences for handicapped individuals and the elderly are typically equipped with transportation systems for lifting and transferring patients between locations. A conventional patient transport system includes a truck that travels along ceiling-mounted rails, for example, running between a bed and a tub or toilet, and a load carrier suspended from the truck. The load carrier can be moved manually or equipped with drive motors for moving the truck along the rails and for powering a lifting and lowering mechanism. One or more batteries are included in the load carrier for supplying power to the drive motors. The batteries are electrically connectable to a charging unit via means provided on the truck and/or rails.

FIG. 1 shows one known conventional system for charging the batteries of the patient transport system described above. A charging, or parking, station 1 is disposed in a rail and positioned at a terminal end thereof. A local or remote charging unit (not shown) is connected to the charging station 1. The engaging end 3 of the charging station has elements 5 for effecting electrical engagement with complementary elements 6 provided on one end of the a movable truck 11. As shown in FIG. 1, the mating elements 5, 6 typically include spring-loaded prongs 7 extending from the charging station 1 and mating contacts 9 provided on the movable truck 11. When engaged with the contacts 9, the prongs 7 deliver current from the charging unit to the batteries (not shown) via electrical conductors 13 extending between the contacts 9 and the batteries. The truck 11 and the charging station 1 are provided with securing means 15, such as an extension 17 engageable in a receiving channel 19 with spring-loaded balls 18 for releasably holding the truck 11 in a charging position.

The system shown in FIG. 1 has certain disadvantages and limitations. First, the charging station is disposed in the path of travel of the truck, and therefore can only be positioned at an end of the rail. Second, the number of possible charging stations is limited, as only one end of the truck is typically equipped with the necessary mating elements and no intermediate stations are possible. Third, the inclusion of mating means on one end of the truck increases the length of the truck, necessitating a larger turning radius for the truck and thereby imposing design limitations on the rail system. Finally, the mating mechanical and electrical elements of the system shown in FIG. 1 occasionally become disengaged so that battery charging is interrupted.

A typical patient transport device having a continuous charging system is disclosed in U.S. Pat. No. 5,138,953. According to the apparatus disclosed in that patent, a transportation device includes bus bars in the form of copper strips on top of insulating layers fastened to the insides of vertically-extending side walls of each rail. Carbon brushes extending from the sides of a movable truck bear against the copper strips and tap the DC voltage at the copper strips. Current is continuously transferred via conductors extending between the brushes and the battery and drive motors. While the device disclosed in U.S. Pat. No. 5,138,953 provides for charging of the battery at any position along the rail, it is not cost effective and is subject to failure, particularly when used in combination with jointed rail systems, as the brushes can become damaged when traversing joints in the rails.

It would be desirable therefore to provide a method of and an apparatus for charging batteries of patient transport systems that are economical and dependable, provide for the multiple, conveniently located charging stations, are suitable for use on jointed and continuous rail systems, and do not place significant restrictions on rail design.

SUMMARY OF THE INVENTION

The present invention is directed to a method of and an apparatus for charging batteries of ceiling-mounted lifts. Multiple in-track charging stations comprising spaced contact plates are positioned at predetermined locations along the upper interior horizontal surfaces of a rail assembly. A short truck having a pair of spring-loaded pins extending from an upper surface thereof and a load carrier suspended from a bolt passing through the carrier traverses the entire rail assembly unencumbered. To charge the batteries provided in the load carrier, a rail mounted assembly is located for convenience within the rail and the truck is positioned such that the spring-loaded pins extending from the upper surface of the truck press against respective ones of the contact plates of the charging station. The plates are secured by conductive screws which are recessed slightly below the surfaces of the plates. An audible "click" and tactile "feel" provide the user with indications that the pins are properly engaged with the recessed contact screws. With the truck in position, current passes from a charging unit connected to the charging station, through the contact screws and the pins, and to the batteries via electrical connectors, such as wires.

The charging system includes a truck-mounted assembly and at least one rail-mounted charging station. The truck-mounted assembly includes a truck body having roller pairs provided on opposite sides thereof. Bores extend through the truck body from top to bottom thereof. Each bore houses a spring-loaded pin assembly, which includes a pin that is biased upwardly such that the upper end of the pin extends above the upper surface of the truck body. An electrical lead is soldered to the lower end of the pin, with the free end thereof exiting the bore through the lower surface of the truck body and ultimately terminating at the batteries to be charged. Insulating bushings are provided in the bores for preventing electrical shorts to the truck body.

Each rail-mounted assembly includes conductive plates, such as brass strips, that are joined to the lower horizontal surface of a cross-piece of the rail. An insulator is positioned between the strips and the rail. Contact screws extend through holes provided in the brass strips, the insulator and the horizontal cross-piece of the rail for connecting the strips and insulator to the rail and for providing a current path from a local or remote charging unit to the inside of the rail. Insulating bushings are disposed in the holes extending through the rail to prevent electrical short circuiting to the rail.

The truck assembly freely traverses the rail system, with the contact pins spaced from the horizontal cross-piece of the rail by a short distance in their fully extended positions. When the truck reaches a charging station, the pins engage beveled ends of the contact plates so as to be cammed inwardly against the pressure of the biasing springs to insure a reliable electrical contact between the pins and contact plates. To charge the batteries, the truck is positioned such that the pins, which are slightly depressed, press against the heads of the contact screws. In that position, a continuous current path from the charging unit to the battery is established.

An important advantage of the battery charging system of the present invention is that it provides for the implementation of multiple charging locations along a continuous or jointed rail system. This is particularly advantageous to those operating the transport system independently. Users can customize new transport systems or retrofit existing systems to enable recharging of the batteries at locations where the unit is typically left for extended periods of time. Inasmuch as no docking or mating elements are required at the ends of the mobile unit, the truck body can be made substantially smaller than those of the prior art systems, thereby enabling the truck to more easily negotiate curves in the rail and allowing for smaller radii of curvature when designing rail systems. The present invention is also superior to prior art continuous charging systems in that it can be used with jointed rail systems and provides for dependable charging. In addition, the present charging system is less prone to being inadvertently disconnected since the spring-biased pins tend to retain the truck in the charging position rather than bias it away from the charging position.

With the foregoing and other advantages and features of the invention that will become hereinafter apparent, the nature of the invention may be more clearly understood by reference to the following detailed description of the invention, the appended claims and to the several views illustrated in the drawings.

BRIEF DESCRIPTION OF THE DRAWINGS

FIG. 3 is a longitudinal cross-sectional view showing the truck-mounted assembly and the track-mounted charging of the present charging system positioned in a track;

FIG. 4 is a fragmentary cross-sectional detail of the charging system taken along line 4—4 of FIG. 3; and FIG. 5 is a fragmentary cross-sectional detail of the truck showing the spring-loaded pin assembly.

DETAILED DESCRIPTION OF THE INVENTION

Figure 2:
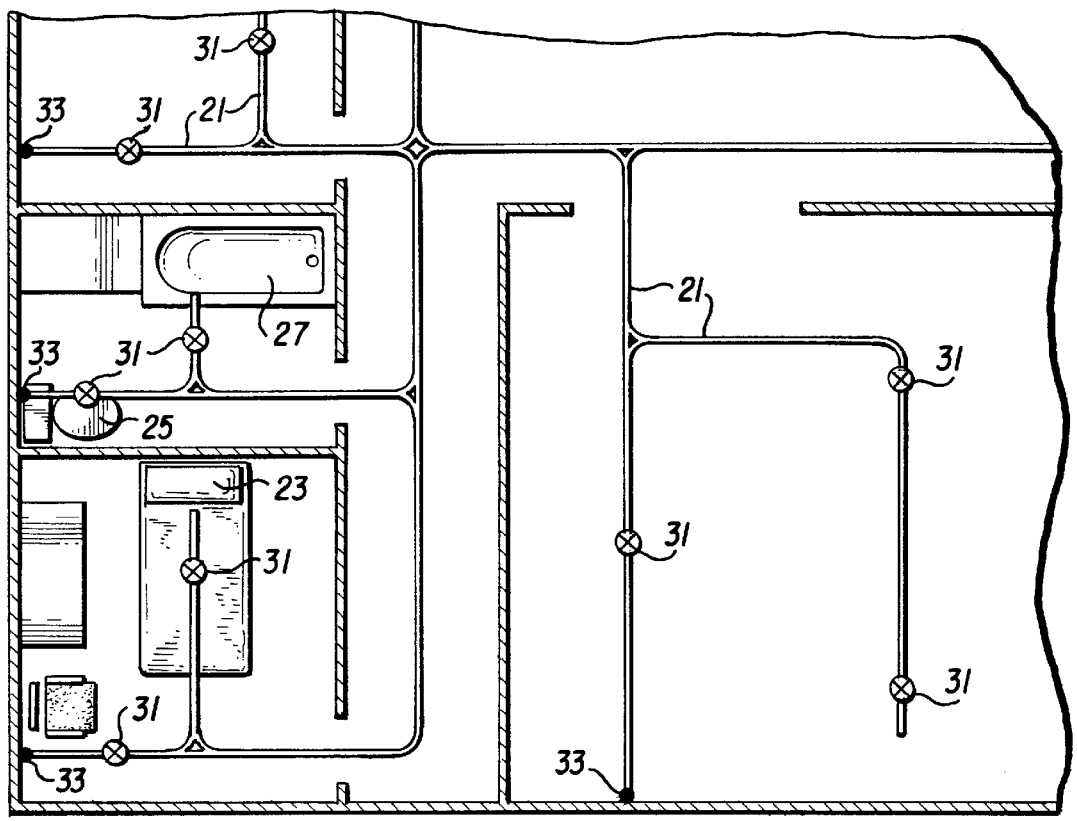
FIG. 2 is a schematic plan view of a multiple room residence having a track positioned therethrough and multiple end and intermediate charging stations of the present invention mounted therein.
Figure 1:
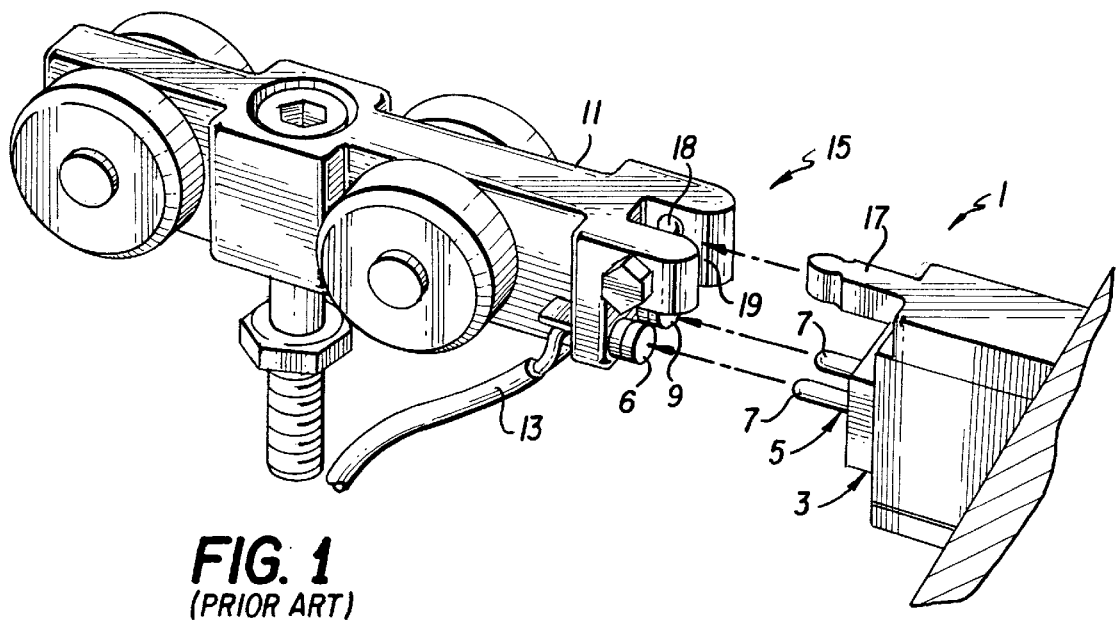
FIG. 1 is a perspective view of a prior art charging system including an end-mounted parking station and a truck having means for lockingly engaging the parking station.

Referring now to the drawings, FIG. 2 illustrates a multiple room structure having a patient transportation system provided therein. The system includes interconnected (i.e., jointed) ceiling-mounted rails 21 positioned for supporting a sling or other carrier device 10 carrying a patient to and from important locations, including over a bed 23 or adjacent a toilet 25 and tub 27. A truck 29 (FIG. 3) having a conventional load carrier (not shown) suspended from a hanger 20 traverses the rails 21. As shown in FIG. 2, the present invention provides for the installation of charging stations 31 at any point along the rails 21. The charging stations 31 are mounted to the rails 21 but do not impede travel of the truck 29 along the rails 21. This is a distinct advantage over prior art systems, as transportation units operating under the present system can be recharged at convenient locations, e.g., where patients typically spend extended periods of time. While the charging stations 31 of the present invention may be installed at ends 33 of the rails 21, such restrictive placement is not required.

FIG. 3 is a longitudinal sectional view of the in-track charging system of the present invention which is generally referred to by reference numeral 35. The charging system 35 includes a pin assembly 37 integrated with the movable truck 29 and one or more rail-mounted charging stations 39.

Referring now to FIGS. 3, 4 and 5 each of the rails 21 along which the truck 29 travels and to which the charging stations 31 are secured is of generally channel-shape. Each rail 21 has a horizontal cross-piece 39, side walls 41 extending downwardly from the cross-piece 39, and bottom portions or lips 43 extending inwardly from lower ends of the side walls 41 such that the bottom portions 43 run parallel to the cross-piece 39. A load carrier (not shown) housing a battery 45 and drive motors (not shown) is movable along the rails 21. Specifically, the load carrier is suspended from the movable truck 29 by a support bolt 47 and hanger 20. The truck 29 includes a main truck body 49 having a top 51, a bottom 53, a front 55, a back 57 and left and right sides 59, 61 (FIG. 4). Rollers 63, such as wheels made of a low-friction material, are connected to the left and right sides 59, 61 and have a diameter slightly greater than the top to bottom height of the body 49. The rollers 63 rest upon and travel along the bottom portions 43 of the rail 21. Stops or other means are provided to prevent the truck 29 from traveling off the ends of the rail 21.

The truck 29 includes a pair of bores 65 (only one shown in FIG. 5) for housing spring-loaded pin assemblies 37. Each bore 65 extends generally vertically through the truck body 49. A contact pin 67 is positioned in each bore 65 such that its upper end projects beyond the top 51 of the truck body 49. As shown in phantom lines to the left of FIG. 3, the pins 67, when in their fully extended positions, do not contact the horizontal cross-piece 39 of the rail 21. When the truck 29 moves into a "charging position" beneath a charging assembly 31, the pins 67 are pressed slightly inwardly. When the truck 29 is moved away from the charging assembly 31, the pins 67 return to their fully extended positions.

Referring to FIG. 5, means is provided in each bore 65 for urging the pin 67 upwardly and for allowing vertical displacement of the pin 67. Such urging means is preferably a spring 69 positioned in a lower portion of the bore 65, with one end of the spring 69 connected to or abutting a lower end, or base 75, of the pin 67. The length of the spring 69, as well as the design of the bore 65 and the pin 67, are selected to prevent the pin 67 from exiting the truck body 49 through the opening in the top 51 thereof. In one embodiment, each bore 65 includes a smaller diameter upper bore portion 71 and a larger diameter lower bore portion 73. The pin base 75 has a narrow shank portion 77 extending upwardly therefrom through the upper bore portion 71 and beyond the top 51 of the truck body 49. The spring 69 is positioned in the lower bore portion 73 and urges the pin 67 upwardly.

A plastic bushing 79 or other insulating means is provided at least along the walls of the bore 65 surrounding the pin 67 for preventing electrical short circuiting against the truck body 49. It is understood that other biasing means and designs for the pins and bores may be used in the present system, and that embodiments of the present system incorporating such modifications are considered to be within the scope of the present invention.

Referring to FIGS. 3 and 5, a wiring cable 81 connects pins 67 to the battery 45 to be charged. Each wire 83 of the cable 81 extends into a bore 65 of the truck body 49 through an opening in the bottom 53 of the truck body 49. Each wire 83 passes up through the lower bore portion 73 of the bore 65 and is connected to the lower end 75, or base, of the pin 67. The wires 83 are preferably soldered to the pins 67. When a spring 69 is provided in each bore 65, the inserted wire 83 extends through the coils of the spring 69.

As an added advantage, the pin assembly 37 is readily a replaceable by securing removable blocks 85 to the bottom 53 of the truck body 49 beneath the bores 65. Each block 85 includes a passage 89 for providing access to the bore 65 in the truck body 49. A fastener 87, such as a screw, is provided for removably connecting the block 85 to the truck body 49. The entire pin assembly 37, or any part thereof, may be removed and replaced by unlocking or otherwise disengaging the fasteners 87 securing the blocks 85 to the truck body 49. When the blocks 85 are removed, the pins 67 and springs 69 are no longer supported in the bores 65 and can be removed therefrom.

Referring to FIGS. 3 and 4, charging station assemblies 31 are positioned in the passage defined by the rail 21 but do not impede travel of the truck 29 therethrough. Each assembly 31 includes an insulator strip 91 mounted on the lower surface 93 of the horizontal cross-piece 39 of the rail 21. The insulator strip 91 is preferably about one-eighth of an inch thick and is made of polycarbonate or any other acceptable insulating material. Metallic plates 95, preferably made of copper or brass, are mounted to the outer surface 97 of the insulator strip 91. Conductive screws 99 extend through the outer surface 101 of the metallic plates 95. As best shown in FIG. 4, the insulator strip 91 has a longitudinal recess 103 provided along its lower central surface 97, with the depth of the recess 103 being substantially equal the thickness of the metallic plates 95. When metallic plates 95 are positioned in the recess 103, the outer surface 101 of each metallic plate 95 is substantially flush with the outer surface 97 of the insulator strip 91. When more than one metallic plate 95 is placed in the recess 103, the metallic plates 95 are spaced apart for electrically isolating each metallic plate from one another.

Referring to FIG. 3, lateral edges 105 of the insulator strip 91 are bevelled to provide a "ramp," such that when the truck 29 initially meets the charging assembly 31, the pins 67 are cammed by the edges 105 and gradually pressed inwardly. When the metallic plates 95 extend to lateral edges 105 of the insulator strip 91, lateral edges 107 of the plates 95 are also bevelled following the slope of the lateral edges 105 of the insulator strip 91. The edges 105 of the insulator strip 91 and, if appropriate, the metallic plates 95, preferably slope inwardly at about a 32° angle.

The insulator strip 91 and the metallic plates 95 lying in the recess 103 of the insulator strip 91 are fastened to the lower surface 93 of the horizontal cross-piece 39 of the rail 21. Mounting holes 111 are provided through the horizontal cross-piece 39 of the rail 21, the insulator strip 91, and the metallic plates 95 for receiving fasteners or conductive screws 99 therethrough. The holes 111 are aligned such that a single fastener 99 extends through a single mounting hole 111 in each component when the charging station 31 is assembled. The insulator strip 91 may serve as the drill template for drilling the mounting holes 111 in the rail 21. The screws 99 for fastening the insulator strip 91 and the metallic plates 95 to the rail 21 may also serve as the conductive path for delivering current to the charging station 31 in the rail 21. As shown in FIGS. 3 and 4, the screws 99 are preferably flat head screws countersunk into the metallic plates 95 and insulator strip 91. Wires 121 extending from a charging unit 123 are connected to the ends of the screws 99 by a pair of conductive nuts 133, 135. The wires are preferably arranged in a harness connected to a charging unit 123. A screw post insulator 137 is provided in each mounting hole 111 in the rail 21 for preventing short circuiting of the screws 99 to the rail 21.

Visual identification means are preferably provided along the outer exposed surfaces of the rails to indicate locations where charging stations are present. Such indicating means include, but are not limited to, stickers and other printed media. Additional means such as an audible signal or lights may be provided for indicating that charging of the battery is taking place or that the transportation unit is in a charging position.

The present invention operates as follows. Multiple charging stations are positioned at predetermined locations along a rail assembly. The movable truck having spring-loaded pins extending from an upper surface thereof and a load carrier suspended from a hanger extending from a lower surface thereof traverses the entire rail assembly without being hindered by the presence of the charging stations. To charge the batteries provided in the load carrier, the most convenient charging station is located and the truck is positioned such that the pins extending from the truck press against the contact screws of the charging station. An audible "click" and tactile "feel" provide the user with an indication that the pins are properly engaging the contact screws. With the truck in position, current passes from a charging unit connected to the charging station, through the contact screws and the pins, and to the batteries via wiring cables.

From the foregoing, it will be appreciated by those skilled in the art that the present invention provides a particularly effective and advantageous method of and apparatus for solving several problems associated with the implementation of patient transportation systems.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A charging system for a patient transportation unit including a rail system having one or more rails, each rail having an upper horizontal cross-piece, a truck having a main body with a top surface and rollers for traveling along said rail, and a load carrier connected to said truck, a battery and a battery charging unit, said charging system comprising:

a pin assembly integrated with said truck, said assembly comprising spring-loaded pins positioned in bores provided in said main body, said pins having upper ends extending upwardly from said top surface of said truck;

a first electrical connection means for connecting said pins to said battery;

at least one charging station mounted to said rail comprising conductive plates connected to said upper horizontal cross-piece of said rail for engaging said pins when said truck is moved to a position thereunder; and second electrical connection means for connecting said plates and said battery charging unit.

2. The system of claim 1, further comprising indicator means provided on an outer surface of said rail for indicating a position of said charging station on said rail.

3. The system of claim 1, including an insulator strip positioned between said cross-piece and said plates and conductive fasteners for securing said plates to said cross-piece.

4. The system of claim 3, wherein said rail has holes provided therethrough through which said fasteners extend, and further comprising insulators positioned in said holes for electrically isolating said fasteners from said rail.

5. The system of claim 1, wherein said pins are biased upwardly by springs mounted in said bores.

6. The system of claim 5, wherein each of said fasteners comprises a conductive flat head screw having a head portion, said pins being engageable with the head portions of said screws for making electrical contact therewith.

7. A battery charging system adapted to be mounted on a rail comprising:
   a movable unit having a body with a top surface and a bottom surface and conductive pins with upper and lower ends, said pins being positioned in said body such that said upper ends of said pins extend beyond said top surface of said body, said pins being connectable to a battery; and
   at least one fixed unit for engaging said upper ends of said pins when said body is moved to a charging position, each fixed unit comprising an insulator strip for mounting on a horizontal surface of said rail, conductive plates mounted to said insulating strip, said conductive plates being connectable to a battery charging unit.

8. The system of claim 7, wherein said movable unit includes a support for transporting a patient along said rail.

9. The system of claim 7, wherein said pins are resiliently biased upwardly into engagement with the conductive plates of said fixed unit.

10. The system of claim 9, wherein said pins are resiliently biased by coil springs.

11. The system of claim 7, wherein said insulating strip and conductive plates have bevelled ends for engaging said pins when said movable unit is moved into a position beneath said fixed unit.

12. The system of claim 7, including a plurality of said fixed units mounted along said rail intermediate the ends thereof.

13. The system of claim 7, wherein said insulating strip has a longitudinal recess having a depth, said conductive plates having a thickness, the thickness of said plates being substantially equal to the depth of said recess.

14. The system of claim 13, including conductive screws for fastening said conductive plates and said insulating strip to the horizontal surface of said rail, said pins being engageable with said conductive screws when said movable unit is in a charging position beneath said fixed unit.

15. The system of claim 7, including bores in said body for receiving said pins, coil springs mounted in said bores for spring biasing said pins upwardly, block means for removably securing said springs and pins in said bores.

16. The system of claim 15, including first wires, each connected at one end thereof to a pin through said block means and said bore and at the other end thereof to said battery.

17. The system of claim 16, including second wires, each connected at one end thereof to said conductive plates and at the other end thereof to said battery charging unit.

18. A method of charging a battery of a patient transportation unit including a ceiling mounted rail comprising the steps of:
   installing at least one charging station on a lower surface of a horizontal cross-piece of said rail, said charging station comprising an insulator strip affixed to said lower surface, conductive plates mounted to said insulator strip and rail by conductive screws, said screws being electrically connected to a battery charging unit;
   providing a truck for movement along said rail, said truck having a top surface, a bottom surface, bores extending through said body from said top surface to said bottom surface, spring-biased pin assemblies arranged in said bores, said pins being urged upwardly and extending above said top surface of said truck, said pins being connected to said battery;
   moving said truck along said rail; and
   engaging said pins with said conductive plates so as to electrically connect said battery charging unit to said battery and bias said pins into engagement with said plates.

19. The method of claim 18, wherein said step of moving said truck along said rail further comprises gradually depressing said pins when said truck is moved into a position beneath said charging station.

* * * * *